(12) United States Patent
Choi et al.

(10) Patent No.: US 6,580,263 B2
(45) Date of Patent: Jun. 17, 2003

(54) BIT RATE DISCRIMINATION DEVICE WITH TEMPERATURE COMPENSATION FUNCTION

(75) Inventors: Jeong-Seok Choi, Seoul (KR); Tae-Sung Park, Kyonggi-do (KR); Hee-Chan Doh, Kyonggi-do (KR); Gil-Yong Park, Kyonggi-do (KR); Yun-Je Oh, Kyonggi-do (KR)

(73) Assignee: Samsung Electronics Co., LTD, Suwon (KR)

( * ) Notice: Subject to any disclaimer, the term of this patent is extended or adjusted under 35 U.S.C. 154(b) by 113 days.

(21) Appl. No.: 09/929,885

(22) Filed: Aug. 15, 2001

(65) Prior Publication Data

US 2002/0065623 A1 May 30, 2002

(30) Foreign Application Priority Data

Aug. 22, 2000 (KR) ........................................ 2000-48502

(51) Int. Cl.[7] ........................ G01R 31/00; G01R 23/17; G01R 27/26; H04B 10/06
(52) U.S. Cl. ...................... 324/96; 324/685; 324/76.36; 359/189
(58) Field of Search .................. 324/685, 760, 324/721, 670, 753, 76.36, 96; 359/127, 174, 341.42, 189

(56) References Cited

U.S. PATENT DOCUMENTS 5,933,265 A  *  8/1999  Nagarajan ................... 359/189
6,091,531 A  *  7/2000  Schwartz et al. ............ 359/189

* cited by examiner

*Primary Examiner*—Christine Oda
*Assistant Examiner*—James Kerveros
(74) *Attorney, Agent, or Firm*—Cha & Reiter

(57) ABSTRACT

Disclosed is a bit rate discrimination device that accurately discriminates a bit rate regardless of variations in the operating temperature. A photoelectric converter converts an input optical signal into an electric signal, and a bit rate detector detects a bit rate of the optical signal from the electric signal and outputs a discrimination signal indicating the bit rate. A DC amplifier outputs a bit rate detection signal by amplifying the discrimination signal, and a temperature detector detects the operating temperature of the DC amplifier and outputs a temperature signal indicating the detected operating temperature. A variation amplifier outputs a temperature compensation signal by amplifying the voltage level difference between the temperature signal and a predetermined reference signal, so as to cancel variations in an output voltage of the DC amplifier according to the operating temperature. A voltage adder outputs a temperature-compensated bit rate detection signal by combining the bit rate detection signal with the temperature compensation signal. A bit rate discriminator determines the bit rate of the input optical signal depending on the voltage level of the temperature-compensated bit rate detection signal.

11 Claims, 5 Drawing Sheets

FIG. 1 [PRIOR ART]

BIT RATE DISCRIMINATION DEVICE WITH TEMPERATURE COMPENSATION FUNCTION

CLAIM OF PRIORITY

This application makes reference to and claims all benefits accruing under 35 U.S.C. Section 119 from an application entitled "Bit Rate Discrimination Device with Temperature Compensation Function," filed in the Korean Industrial Property Office on Aug. 22, 2000 and there duly assigned Ser. No. 2000-48502.

BACKGROUND OF THE INVENTION

1. Field of the Invention

The present invention generally relates to a light transmission system, and, in particular, to a bit rate discrimination device for use in a light transmission system.

2. Description of the Related Art

A light transmission system can adopt various protocols, such as FDDI (Fiber Distributed Data Interface), ESCON (Enterprise Systems Connectivity), Fiber Channel, Gigabit Ethernet, and ATM (Asynchronous Transfer Mode) for high-bandwidth and high-bit-rate communications. Fiber optics technology can adopt various bit rates of 125 Mb/s, 155 Mb/s, 200 Mb/s, 622 Mb/s, 1062 Mb/s, 1.25 Gb/s, and 2.5 Gb/s to supply the capacity to meet the demand for multimedia applications. In operation, the light transmission system adopts one set of the protocols as a multiplexing format for using any number of bit rates. In this type of light transmission system, the bit rate of an optical signal is set previously to a specific rate, such that an optical receiver can be designed to match the incoming bit rate. The function of an optical receiver is to convert an input optical signal into an electric signal, and thereafter restores the electric signal to the original data that is noise-free.

FIG. 1 illustrates a conventional bit rate discrimination device, which includes a photoelectric converter 110; a signal processor 120; a bit rate detector 130; a DC (Direct Current) amplifier 140; and, a bit rate discriminator 150.

During operation, the photoelectric converter 110 converts an input optical signal into an electric signal 112. A photodiode is typically used for the photoelectric converter 110. The signal processor 120 amplifies the electric signal 112 into a standardized electric signal 122, such that a level "0" and a level "1" of the electric signal 122 have predetermined values, respectively. The bit rate detector 130 outputs a discrimination signal 132, representing the number of pulses proportionate to the bit rate of the standardized electric signal 122. The DC amplifier 140 outputs a bit rate detection signal 142 by amplifying the discrimination signal 132, wherein the voltage level of the bit rate detection signal 142 is linearly increased according to the bit rate. The bit rate discriminator 150 discriminates the bit rate of the optical signal between a "1" and a "0" from the voltage level of the bit rate detection signal 142.

However, the DC amplifier 140 of the conventional bit rate discrimination device, as described in the preceding paragraph, is very susceptible to variations in the operating temperature, making it difficult to stabilize its output. Hence, the bit rate discriminator 150 tends to inaccurately determine the bit rate of the optical signal depending on the unstable voltage level of the bit rate detection signal 142. As a result, it is difficult to accurately discriminate the bit rate by means of a bit rate discriminator.

SUMMARY OF THE INVENTION

The present invention is directed to a device that is capable of accurately discriminating the bit rate regardless of variations in the operating temperature.

The present invention provides a bit rate discrimination device with a temperature compensation function. The device includes a photoelectric converter for converting an input optical signal into an electric signal; a bit rate detector for detecting the bit rate of an optical signal from the electric signal and for outputting a discrimination signal indicating the bit rate; a DC amplifier for outputting a bit rate detection signal by amplifying the discrimination signal; a temperature detector for detecting the operating temperature of the DC amplifier and outputting a temperature signal indicating the detected operating temperature; a variation amplifier for outputting a temperature compensation signal by amplifying the voltage level difference between the temperature signal and a predetermined reference signal, so as to cancel variations in an output voltage of the DC amplifier according to the operating temperature; a voltage adder for outputting a temperature-compensated bit rate detection signal by combining the bit rate detection signal with the temperature compensation signal; and, a bit rate discriminator for determining the bit rate of the input optical signal according to the voltage level of the temperature-compensated bit rate detection signal.

According to another aspect of the present invention, a signal processor standardizes the electric signal output from the photoelectric converter, such that the voltage levels of "0" and "1" of the electric signal have predetermined values, respectively, thus providing the standardized electric signal to the bit rate detector.

According to another aspect of the present invention, the DC amplifier has a characteristic in which the voltage level of the bit rate detection signal is increased in proportion to an increase in the operating temperature. In addition, the variation amplifier has a characteristic in which the voltage level of the temperature compensation signal is decreased in proportion to an increase in the operating temperature of the DC amplifier.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purpose of clarity and simplicity, wellknown functions or constructions are not described in detail as they would obscure the invention in unnecessary detail.

Figure 1:
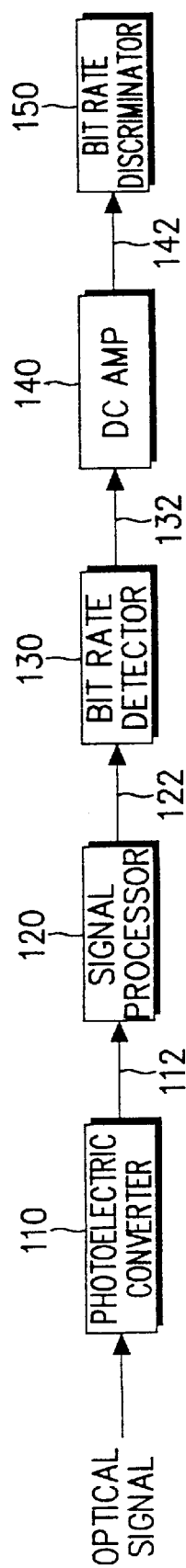
FIG. 1 is a block diagram illustrating a conventional bit rate discrimination device.
Figure 2:
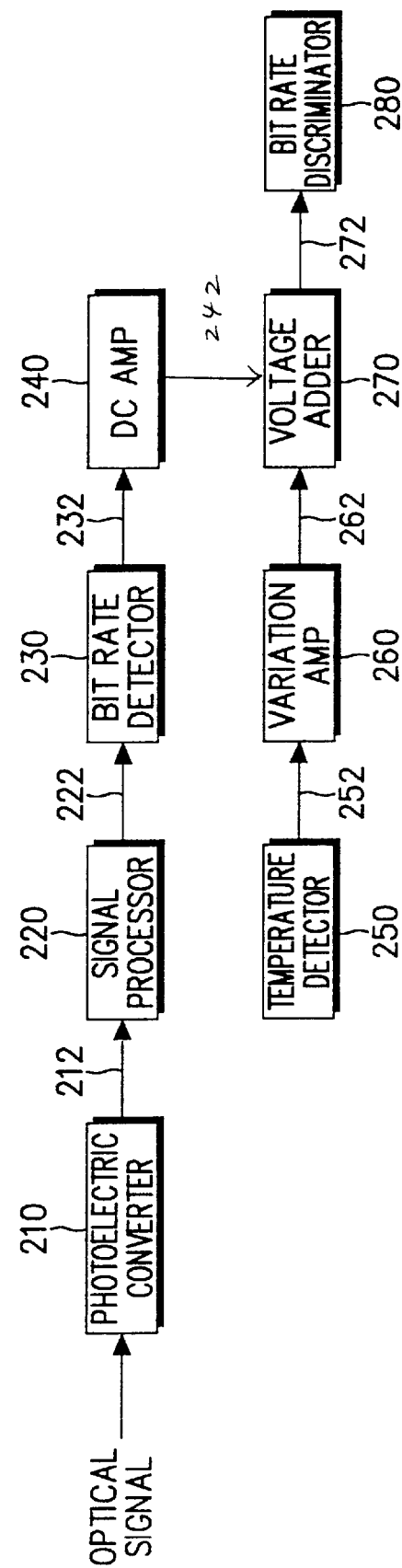
FIG. 2 is a block diagram illustrating a bit rate discrimination device with a temperature compensation function according to an embodiment of the present invention.

FIG. 2 illustrates a bit rate discrimination device with a temperature compensation function according to an embodiment of the present invention. The bit discrimination device includes a photoelectric converter 210 for converting an input optical signal into a corresponding electric signal 212; a signal processor 220 for standardizing (or digitalizing) the voltage level of the electric signal 212; a bit rate detector 230 for outputting a discrimination signal 232; a DC amplifier 240 for amplifying the discrimination signal 232; a temperature detector 250 for detecting the operating temperature of the DC amplifier 240; a variation amplifier 260 for outputting the temperature compensation signal 262; a voltage adder 270 for combining the output signal 242 of the DC amplifier 240 with the temperature compensation signal 262; and, a bit rate discriminator 280 for discriminating the bit rate of the signal received thereon.

In operation, the photoelectric converter 210 converts the input optical signal to the electric signal 212. A photodiode or a CCD (Charge Coupled Device) may be used for the photoelectric converter 210. The signal processor 220 amplifies the electric signal 212 to a standardized electric signal 222, such that "0" and "1" of the electric signal 212 have predetermined values, respectively.

Figure 3A:
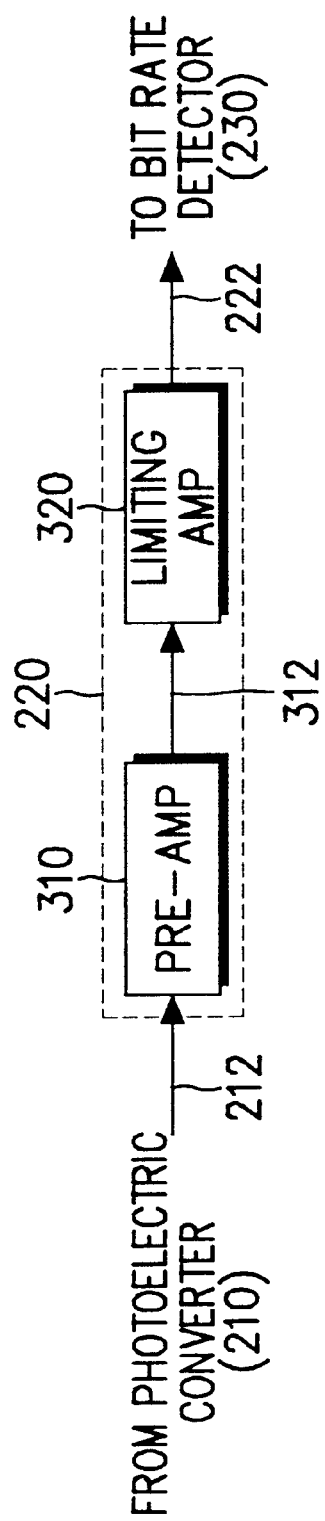
FIG. 3A is a detailed block diagram illustrating the signal processor of FIG. 2.

FIG. 3A illustrates a detailed structure of the signal processor 220. As shown in FIG. 3A, the signal processor 220 is comprised of a preamplifier 310 and a limiting amplifier 320. The preamplifier 310 amplifies the electric signal 212 output from the photoelectric converter 210, and the limiting amplifier 320 limits the voltage levels "0" and "1" of the amplified electric signal 312 to predetermined values, respectively.

With continued reference to FIG. 2, the bit rate detector 230 detects the bit rate of the optical signal based on the electric signal 222 output from the signal processor 220, then outputs a discrimination signal 232 indicating the bit rate.

Figure 3B:
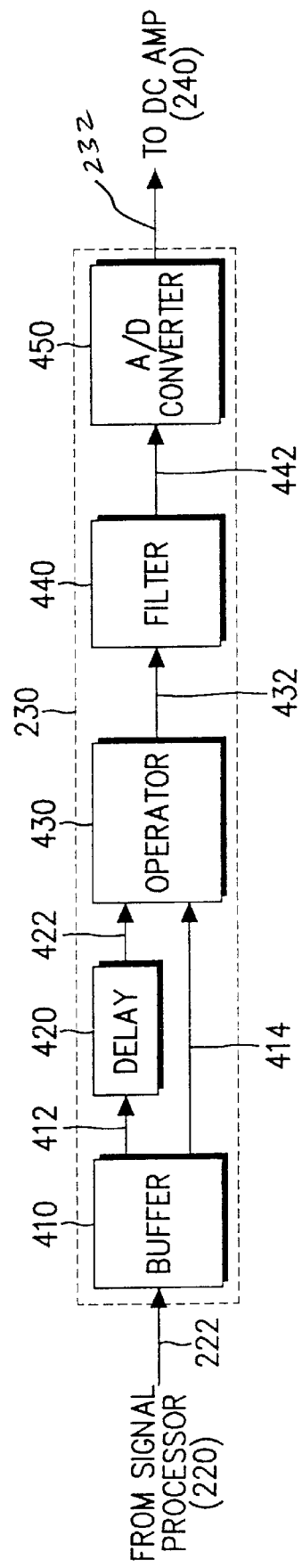
FIG. 3B is a detailed block diagram illustrating the bit rate detector of FIG. 2; and, FIG. 4 is a diagram for explaining the temperature compensation method performed by the bit rate compensation discrimination device of FIG. 2.

FIG. 3B illustrates a detailed structure of the bit rate detector 230. As shown in FIG. 3B, the bit rate detector 230 is comprised of a buffer 410, a delay 420, an operator 430, a filter 440, and an analog-to-digital (A/D) converter 450. The buffer 410 distributes the electric signal 222 provided from the signal processor 220 to the delay 420 and the operator 430. The delay 420 delays the provided electric signal 412 and outputs a delayed signal 422 to the operator 430. The operator 430 XORs the electric signal 414 provided directly from the buffer 410 as well as the delayed signal 422 provided from the delay 420, and then outputs a discrimination signal 432. The discrimination signal 432 is comprised of a plurality of pulses having the same high-level period as the delay time of the delay 420. That is, the number of pulses of the discrimination signal 432 varies depending on the bit rate of the electric signal 222, and the number of the pulses is proportionate to the bit rate of the electric signal 222. The filter 440 low-pass-filters the discrimination signal 432 that is provided from the operator 430, and the A/D converter 450 converts the filtered analog signal 442 to a digital discrimination signal 232.

Turning back to FIG. 2, the DC amplifier 240 amplifies the discrimination signal 232 and provides the amplified discrimination signal 242 to the voltage adder 270. The voltage level of the bit rate detection signal 242 outputted from the DC amplifier 240 is very susceptible to variations in the temperature as the output characteristic of the DC amplifier 240 varies according to the temperature. In particular, when the difference between the bit rates of the discrimination signals 232 that is provided to the DC amplifier 240 is small, the DC voltage level difference responsive to the bit rate difference becomes less than the difference caused by the variations in the temperature. Therefore, when the ambient temperature varies over several tens of ° C., the DC amplifier 240 can not output the bit rate discrimination signal 242 with a discriminating voltage level. As a result, the bit rate discriminator 280 cannot accurately discriminate the bit rate of the optical signal due to the unstable voltage level of the bit rate detection signal 242.

To address the above problem, the temperature detector 250 is provided to detect the operating temperature of the DC amplifier 240 and outputs a temperature signal 252 indicating the detected operating temperature. The variation amplifier 260 outputs a temperature compensation signal 262 by amplifying the voltage level difference between the temperature signal 252 and a predetermined reference signal. That is, the variation amplifier 260 outputs the temperature compensation signal 262 so as to enable the DC amplifier 240 to have a constant gain regardless of the operating temperature. The voltage adder 270 combines the bit rate detection signal 242 from the DC amplifier 240 with the temperature compensation signal 262, and provides the resulting temperature-compensated bit rate detection signal 272 to the bit rate discriminator 280.

Finally, the bit rate discriminator 280 can now discriminate the bit rate of the optical signal utilizing the voltage level of the temperature-compensated bit rate detection signal 272. This is possible because the voltage level of the temperature-compensated bit rate detection signal 272 is linearly increased according to the bit rate.

Figure 4:
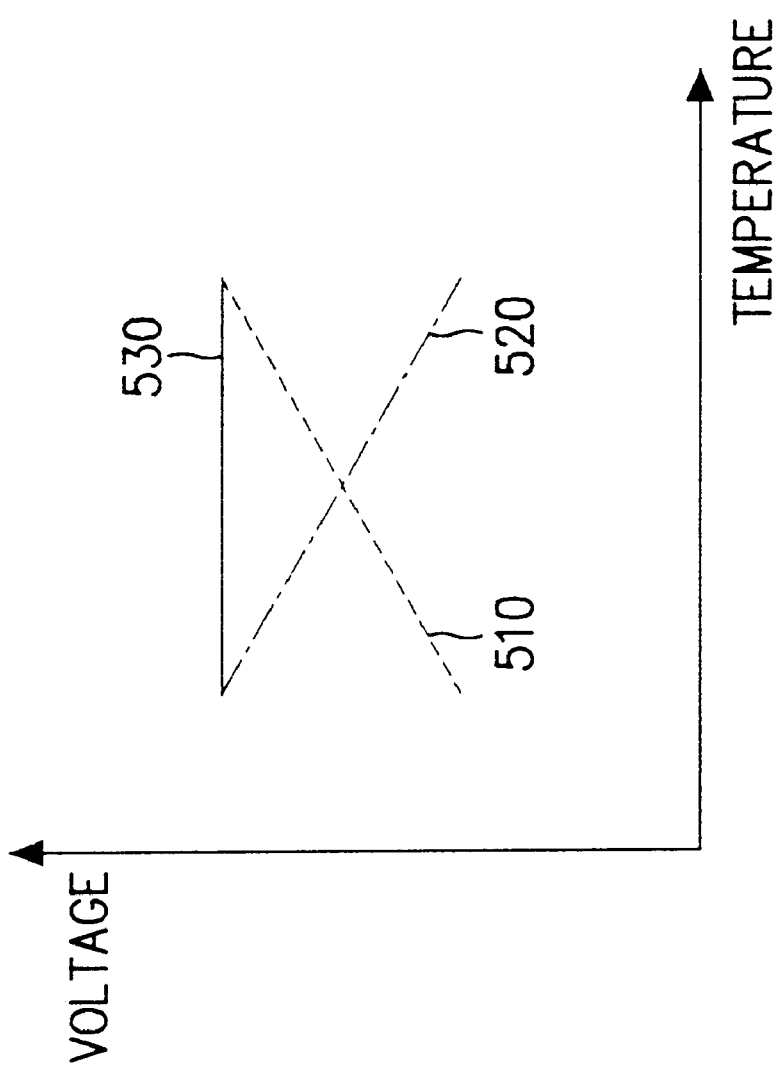

FIG. 4 illustrates a key principle of the present invention of providing a temperature compensated bit rate using the bit rate discrimination device of FIG. 2. As shown in FIG. 4, the dotted line 510 indicates an output voltage characteristic of the DC amplifier 240 according to its operating temperature. As represented by the dotted line 510, the DC amplifier 240 exhibits a characteristic in which the voltage level of the bit rate detection signal 242 increases in proportion to an increase in the operating temperature. Meanwhile, the dot-dash line 520 indicates an output voltage characteristic of the variation amplifier 260 according to the operating temperature of the DC amplifier 240. The variation amplifier 260 exhibits a characteristic in which the voltage level of the temperature compensation signal 262 decreases in proportion to an increase in the operating temperature of the DC amplifier 240. Accordingly, the solid line 530 indicates an output voltage characteristic of the voltage adder 270 according to the operating temperature of the DC amplifier 240. That is, the temperature-compensated bit rate detection signal 272 outputted from the voltage adder 270 exhibits a constant voltage level regardless of variations in the operating temperature of the DC amplifier 240.

As described above, the bit rate discrimination device according to an embodiment of the present invention detects the operating temperature of the DC amplifier and generates the temperature compensation signal according to the detected operating temperature, thereby making it possible to accurately discriminate the bit rate regardless of variations in the operating temperature.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A bit rate discrimination device having a temperature compensation function, comprising:
   a photoelectric converter operable to convert an input optical signal into an electric signal;
   a bit rate detector for detecting a bit rate of the optical signal from the electric signal and for outputting a discrimination signal indicating the bit rate;
   a DC (Direct Current) amplifier for outputting a bit rate detection signal by amplifying the discrimination signal;
   a temperature detector for detecting an operating temperature of the DC amplifier and for outputting a temperature signal indicating the detected operating temperature;
   a variation amplifier for outputting a temperature compensation signal by amplifying a voltage level difference between the temperature signal and a predetermined reference signal;
   a voltage adder for outputting a temperature-compensated bit rate detection signal by combining the bit rate detection signal with the temperature compensation signal; and,
   a bit rate discriminator for determining a bit rate of the input optical signal depending on a voltage level of the temperature-compensated bit rate detection signal.

2. The device of claim 1, further comprising a signal processor for standardizing the electric signal output from the photoelectric converter so that a voltage level "0" and a voltage level "1" of the electric signal have predetermined values, respectively, and for providing the standardized electric signal to the bit rate detector.

3. The device of claim 2, wherein the signal processor further comprises a preamplifier for amplifying the electrical signal output from the photoelectric converter and a limiting amplifier for limiting the voltage level of the amplified electric signal to predetermined values, respectively.

4. The device of claim 1, wherein the DC amplifier has a characteristic in which the voltage level of the bit rate detection signal increases in proportion to an increase in the operating temperature.

5. The device of claim 1, wherein the variation amplifier has a characteristic in which the voltage level of the temperature compensation signal decreases in proportion to an increase in the operating temperature of the DC amplifier.

6. The device of claim 1, wherein the variation amplifier cancels the variation of the output voltage of DC amplifier according to the operating temperature.

7. An optical communication system comprising:
   converting means for converting an input optical signal into an electric signal;
   detecting means for detecting a bit rate of the electric signal to produce a discrimination signal indicative of the bit rate;
   amplifying means for amplifying the discrimination signal;
   temperature detecting means for detecting an operating temperature of said amplifier means to produce a temperature signal indicative of the detected operating temperature;
   means for outputting a temperature compensation signal, said temperature compensation signal is generated by amplifying a voltage level difference between the temperature signal and a predetermined reference signal;
   combining means for combining the bit rate detection signal with the temperature compensation signal to produce a temperature-compensated bit rate detection signal; and,
   discriminator means for dividing the combined signal into a first signal and a second signal to determine a bit rate of the input optical signal.

8. The system of claim 7, further comprising a signal processing means for standardizing the electric signal output from said converting means so that a voltage level "0" and a voltage level "1" of the electric signal have predetermined values, respectively.

9. The system of claim 7, wherein the signal processing means further comprise a preamplifier for amplifying the electrical signal output from said converting means and a limiting amplifier for limiting the voltage level of the amplified electric signal to predetermined values, respectively.

10. The system of claim 7, wherein said amplifier has a characteristic in which the voltage level of the bit rate detection signal increases in proportion to an increase in the operating temperature.

11. The system of claim 7, wherein the variation amplifier has a characteristic that a voltage level of the temperature compensation signal is decreased in proportion to an increase in the operating temperature of said amplifying means.

* * * * *